No. 861,684. PATENTED JULY 30, 1907.
A. P. STEWART, Jr.
SPRING WHEEL.
APPLICATION FILED MAR. 31, 1906.
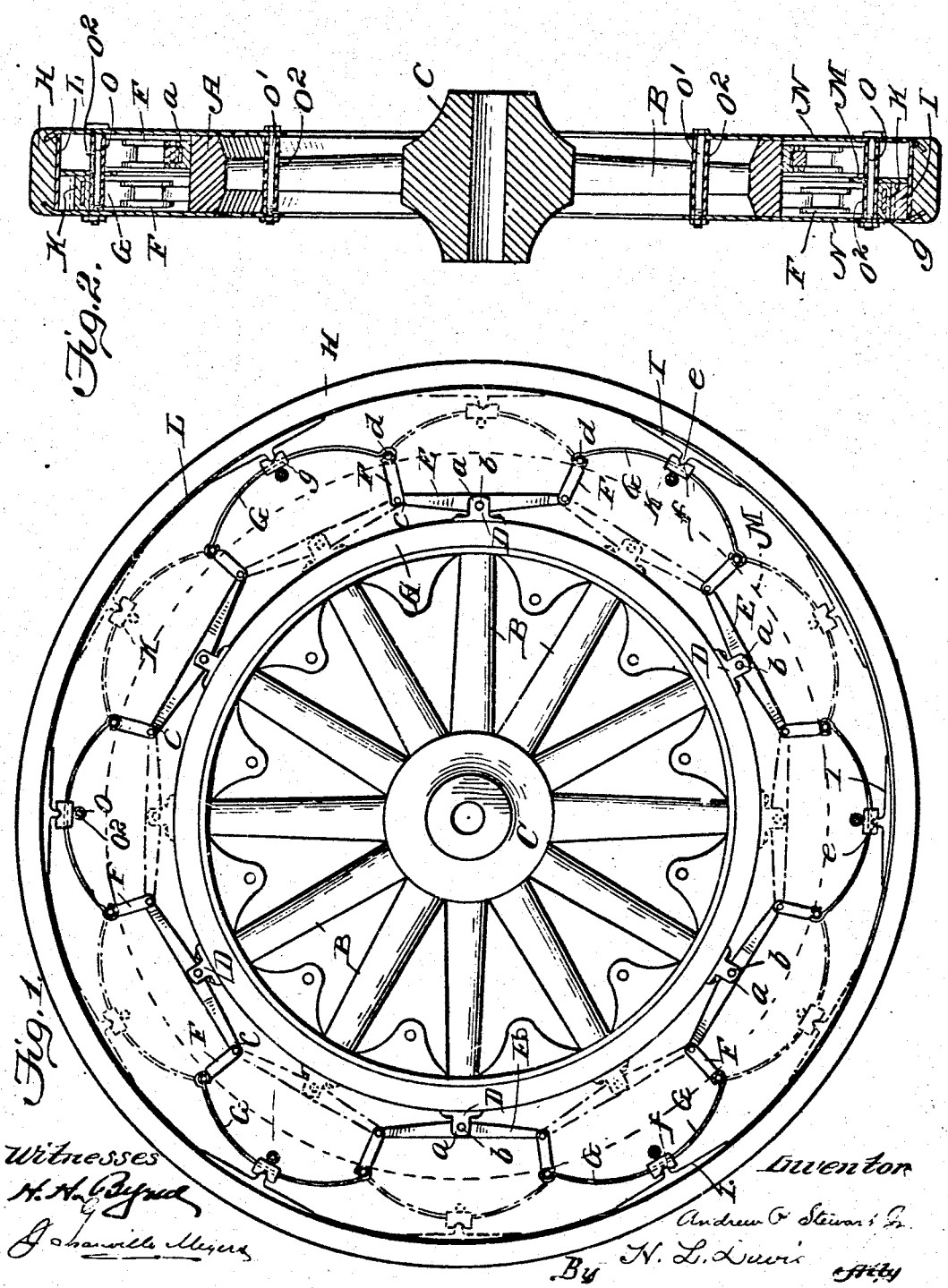

UNITED STATES PATENT OFFICE.

ANDREW P. STEWART, JR., OF ATLANTA, GEORGIA.

SPRING-WHEEL.

No. 861,684.  Specification of Letters Patent.  Patented July 30, 1907.

Application filed March 31, 1906. Serial No. 309,167.

*To all whom it may concern:*

Be it known that I, ANDREW P. STEWART, Jr., a citizen of the United States, residing at Atlanta, in the county of Fulton and State of Georgia, have invented new and useful Improvements in Spring-Wheels, of which the following is a specification.

My invention relates to spring-wheels, and has for its object to provide a wheel of that character which shall serve all the purposes of a vehicle wheel provided with the usual pneumatic tire, by imparting thereto smooth and easy riding, and at the same time obviate the temporary uselessness of the latter, as is the case in a puncture or leak in the tire.

My wheel is more particularly adapted to automobiles, but can, of course, be as readily used on any other vehicle.

It comprises in the main, a wheel of ordinary structure with an inner and an outer rim having interposed therebetween spring members which serve as the resilient means for overcoming the unevenness of a road with its consequent jarring to the vehicle body. I attain these objects by the constructions illustrated in the accompanying drawings, in which,—

Figure 1, is an elevation of the wheel, and Fig. 2, a horizontal section through the same.

Similar letters of reference refer to similar parts in both views.

My wheel comprises a complete inner wheel, which is similar to ordinary vehicle wheels, and consists of the felly A, the several spokes B and the hub C. This inner wheel has on the outer periphery of its felly, and at intervals equivalent to the spaces between the spokes therein, plates D, which are secured to the felly by any suitable means, preferably by bolts passing through the plates and felly. Said plates D are each provided with two upright and parallel lugs a, and are disposed about the inner wheel at the distances aforesaid but alternately arranged on either side of the rim; thus one plate is secured to the left of a spoke while the following plate is to the right of the next spoke. By this arrangement of the plates D, I am enabled to secure a better distribution of the resiliency of the spring members interposed between the inner and outer rims.

Interposed between the lugs a of the plates D are bars or equalizers E, which are secured thereto by bolts b that serve as pivot bearings to allow a rocking motion to the equalizers. The length of the members E is that of the distance between their mounts D, and since said mounts or plates D are alternately arranged about the internal wheel, the end of each equalizer E will meet on a plane parallel with the opposite end of the adjacent equalizer. Each end c of the equalizers E carries a link or toggle F, said toggles being arranged radially to the hub C of the internal wheel, and at their radial extensions are pivotally secured to the ends d of flat arcuate springs G. The springs G may be made of one or more leaves as preferred. Said ends d of springs G have their corners cut away at right angles to provide tongues which being turned upon themselves provide suitable bearings for pins which hold the side plates of the toggles assembled, and in engagement with the springs G; the cut away portions of said springs permitting freedom of movement for the links. The tension of springs G is normally in a horizontal plane or in the direction of the inner periphery of the external rim H. Said tension tends to hold the links F in an upright position with relation to the meeting ends c of the equalizers E.

The outer wheel H comprises a tire, and a ring L which may be made of any resilient metal to serve as a springy bed for the tire; said tire may be of any suitable material, in one piece or in segmental sections. About the inner face of the metallic ring and at intervals corresponding to those between plates D, are bearing plates I which have their outer faces shaped to conform with the contour of the ring L. The inner faces of said bearing plates are flat and provided each with a lug e, intermediate between its ends. The lugs e are adapted to engage within sockets f of the cradle blocks K and are held in such engagement by the tension of springs G. The cradle blocks K are further provided with transverse openings g through which the flat springs G are adapted to pass.

At either side of the inner and outer rims I provide circumferential plates N, thereby forming a housing closed against the ingress of dirt or pebbles, or other matter which would interfere with the function of the springs. The guard plates N also serve the additional function of guides by bearing loosely against the sides of the internal wheel A, and are thereby permitted to slide against said sides upon any movement of the springs within the chamber. The outer edges of the plates N, or those adjacent to the larger wheel, are bent at an angle about the metallic ring L and terminate embedded within the body of the tire. On the inner periphery of the metallic ring L and intermediate its edges, is an integral circumferential flange M which extends approximately half the distance between the outer and internal rims. The faces of flange M are adapted to fit against the inner sides of blocks K and hold said block against lateral movement. Extending laterally through the guard and guide plates N and the radial flange M, are bolts O, O', which clamp said plates N to the sides of the inner and outer wheels. The bolts O are further utilized to fit lightly against the heads of the block K and hold the sockets of said blocks in engagement with the lugs e of the plates I, and prevent said blocks from becoming disengaged. Flange M divides the chamber into two compartments, thus providing a separate and distinct apartment for each of the series of radial springs. The bolts O, O' may, if desired, be provided with sleeves O² to serve as spacing pieces between the plates N.

Having thus described my invention, what I claim is:

1. A vehicle-wheel having an inner rim connected to the hub, an outer rim, series of alternating spring members and equalizers interposed between said rims, and a circumferential flange adapted to provide chambers for said series.

2. A vehicle-wheel having an inner felly-rim connected to the hub, an outer resilient rim, series alternating spring members interposed between said rims, equalizers and toggles connecting and supporting said series of spring members, and a circumferential flange adapted to provide chambers for said series.

3. A vehicle-wheel having an inner felly-rim and an outer resilient rim, circumferential plates inclosing said rims to provide a housing, a circumferential plate within said housing to provide chambers, series of alternating spring members and equalizers within said chambers, bearings for said equalizers and spring members, and means for connecting the equalizers with the spring members.

4. A vehicle-wheel having an inner felly-rim and an outer resilient rim, circumferential plates inclosing said rims to provide a closed chamber, a radial flange on the inner periphery of said outer rim to provide compartments within the chamber, series of springs and equalizers within each compartment, and toggle joints connecting said equalizers and springs.

5. A vehicle-wheel having an inner and outer rim, circumferential guide plates inclosing said rims to provide a chamber, said inner rim adapted to slide within said guide plates, compartments within said chamber, series of equalizers and springs within said compartments, and toggle joints connecting said springs and equalizers.

6. A vehicle-wheel having an inner and outer rim, circumferential guide and guard plates inclosing said inner and outer rims to provide a chamber, a radial flange within said chamber to provide compartments, bolts passing through said plates and flange, series of springs and equalizers within each compartment, and means connecting said equalizers and springs.

7. In a spring wheel, the combination of an inner felly-rim, an outer resilient rim, circumferential plates on either side of said rims to provide a closed chamber, a radial flange within said chamber to provide compartments, equalizers pivotally mounted over alternating spokes on the inner rim within one compartment, equalizers similarly mounted over the intermediate spokes within the other compartments, springs on blocks within the chamber, toggle joints connecting said springs and equalizers, and bolts passing through the side plates and flange over the spring blocks to lock said plates and hold the springs in engagement.

In testimony whereof I have hereunto set my hand in presence of two subscribing witnesses.

ANDREW P. STEWART, Jr.

Witnesses:
A. C. SMITH,
FRANCO FLORES.